(12) United States Patent
Deng et al.

(10) Patent No.: US 11,121,641 B1
(45) Date of Patent: Sep. 14, 2021

(54) HIGH-POWER MACHINE DRIVE SYSTEM BASED ON MODULAR MULTILEVEL CONVERTER

(71) Applicant: SOUTHEAST UNIVERSITY, Jiangsu (CN)

(72) Inventors: Fujin Deng, Jiangsu (CN); Pengyuan Jiang, Jiangsu (CN); Yihua Hu, Jiangsu (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 17/265,474

(22) PCT Filed: Jan. 2, 2020

(86) PCT No.: PCT/CN2020/070007
§ 371 (c)(1),
(2) Date: Feb. 2, 2021

(87) PCT Pub. No.: WO2021/047130
PCT Pub. Date: Mar. 18, 2021

(30) Foreign Application Priority Data

Sep. 10, 2019 (CN) .......................... 201910851440.0

(51) Int. Cl.
*H02M 7/483* (2007.01)
*H02M 1/00* (2006.01)

(52) U.S. Cl.
CPC ....... *H02M 7/4833* (2021.05); *H02M 1/0095* (2021.05)

(58) Field of Classification Search
CPC .......... H02M 7/42; H02M 7/48; H02M 7/483; H02M 7/4833; H02M 1/0095
See application file for complete search history.

(56) References Cited

U.S. PATENT DOCUMENTS

| | | | | |
|---|---|---|---|---|
| 5,903,066 A | * | 5/1999 | Enjeti ................. | H02M 1/4216 307/105 |
| 2018/0083550 A1 | * | 3/2018 | Chung ................ | H02M 7/5388 |

FOREIGN PATENT DOCUMENTS

| CN | 101079578 A | 11/2007 |
|---|---|---|
| CN | 108599603 A | 9/2018 |

(Continued)

OTHER PUBLICATIONS

Peng, Hao "Research on Steady-state Analysis and Capacitor Voltage Balancing Method for Modular Multilevel Converters" Chinese Doctoral Dissertations Full-text Database (Engineering Science and Technology II), No. 12, 2016, C042-7, Dec. 2016,169 pages.

*Primary Examiner* — Adolf D Berhane
(74) *Attorney, Agent, or Firm* — Muncy, Geissler, Olds & Lowe, P.C.

(57) ABSTRACT

The present invention discloses a high-power machine drive system based on a modular multilevel converter (MMC), which belongs to the technical field of power generation, power transformation, or power distribution. The high-power machine drive system consists of a modular multilevel converter and a multi-pulse cycloconverter. The MMC outputs k phases of high-frequency AC voltages with a phase difference of $2\pi/k$, and the multi-pulse cycloconverter outputs a low-frequency voltage to drive a corresponding machine. According to the present invention, the MMC is combined with the multi-pulse cycloconverter, and by adopting the MMC that operates at a high frequency, the capacity, the volume, and the weight of the energy storage capacitor of the MMC are reduced, the voltage level at the DC side of the MMC is increased, and the capacity of the drive system is increased. By adopting the multi-pulse cycloconverter, quality of an output waveform at a machine side can be guaranteed, thereby implementing low fre- (Continued)

quency control on the machine. The present invention may be adapted to drive a high-power low-speed machine.

5 Claims, 4 Drawing Sheets

(56) References Cited

FOREIGN PATENT DOCUMENTS

| | | | |
|---|---|---|---|
| CN | 109474008 | A | 3/2019 |
| CN | 110611460 | A | 12/2019 |
| EP | 1306964 | A1 | 5/2003 |

* cited by examiner

HIGH-POWER MACHINE DRIVE SYSTEM BASED ON MODULAR MULTILEVEL CONVERTER

BACKGROUND

Technical Field

The present invention discloses a high-power machine drive system based on a modular multilevel converter, and relates to the technology of a multilevel power electronic converter, which belongs to the technical field of power generation, power transformation, or power distribution.

Related Art

Compared with traditional two-level or three-level converters, a modular multilevel converter (MMC) has the advantages of high modularity, high power, high energy transmission efficiency, low harmonics of the AC side output voltage, capability of implementing redundancy control, and the like, which is suitable for high-voltage and high-power applications and currently has been widely used in fields such as high voltage DC transmission, rail transit, medium voltage machine drive, and the like.

A theoretical research shows that a fluctuation of a capacitor voltage of each sub-module of the MMC is inversely proportional to the AC side output frequency. If the MMC is used to directly drive a high-power low-speed machine, large fluctuations of the capacitor voltage of the sub-module may be caused, which affects the quality of the AC side output waveform, and may even affect the normal operation of the MMC and the machine in severe cases. In order to suppress the fluctuation of the capacitor voltage of the sub-module, the method of increasing the capacitor capacity is usually adopted, which also causes a high proportion of volume and weight of the capacitor and high system construction and maintenance costs, which limits the application of the MMC in the field of medium and high voltage machine drive.

Currently, a three-level power converter or a unit cascade power converter is usually used to drive a high-power low-speed machine. A main circuit structure of three-level power converter is simple and easy to operate, but cannot be applied to the situation with higher power level because the three-level output voltage has a large harmonic content and the output voltage range is limited by the withstand voltage conditions of power devices. A phase-shifting transformer is adopted at an input side of the unit cascade power converter to solve the problem of high harmonics of the voltage at the output side. In addition, the voltage withstand requirement of a single power device is reduced through the cascade of power units, so that high-voltage power conversion can be easily implemented. However, due to the difference between basic potentials of the power units, a multi-coil isolation transformer is required to be adopted for insulation, and the system structure is relatively complicated.

In order to improve the defects of the existing driving solution of the high-power low-speed machine, a MMC driving circuit is to be adopted to realize the low-speed driving of the high-power machine. However, the low-frequency voltage fluctuation of the MMC restricts the application of the MMC in low-speed driving of the high-power machine. For the problem of the low-frequency voltage fluctuation of the MMC, the traditional solution is to inject a high-frequency common-mode voltage or inject a selected circulating current. However, such a solution may have adverse effects on the harmonics, voltage stress, and loss of the MMC system, thereby causing adverse effects on the harmonics and loss of the machine. There are also some technologies that can alleviate the problem of the low-frequency voltage fluctuation by changing the structure of the MMC system. However, such methods need to adjust the MMC control method, which is more complicated. In addition, the existing method of driving a high-power low-speed machine through the MMC drive circuit only improves the fluctuation of the capacitor voltage during the machine start-up phase. After the machine is started, the MMC usually operates at a low frequency (such as 50 Hz), and therefore the capacity, the volume, and the weight of the capacitor are not effectively reduced.

SUMMARY

The purpose of the present invention is to provide a high-power machine drive system based on a modular multilevel converter for the shortcomings of the above background technology, and reduce the capacity, the volume, and the weight of the energy storage capacitor of the MMC by adopting the MMC operating at high frequency, and increase the voltage level at the DC side of the MMC, and increase the capacity of the drive system. A multi-pulse cycloconverter is used to ensure the quality of an output waveform at a machine side, and implement low-frequency control on the machine, which solves the problem of larger fluctuations of a capacitor voltage during direct drive of the high-power low-speed machine by the MMC, and overcomes the defect that the existing MMC drive circuit affects the machine harmonics and loss or needs to change the MMC control method although capable of improving the defects of the solution of direct drive.

In order to achieve the objective of the present invention, the following technical solution is adopted in the present invention.

A high-power machine drive system based on a modular multilevel converter consists of a modular multilevel converter, a multi-pulse cycloconverter, a carrier generation module, a speed vector controller, and a multi-pulse modulator. The MMC includes k phases of AC side outputs, and each phase of the converter includes upper and lower arms, each of the arms includes n identical sub-modules and an arm inductor, the DC side of each phase is connected to the same DC bus, and the $k^{th}$ phase of AC side output of the converter is connected to the $k^{th}$ phase of input of each of the multi-pulse cycloconverters. The multi-pulse cycloconverters are divided into a zero-type structure and a bridge-type structure. Compared with the cycloconverter with the bridge-type structure, the thyristor required by the cycloconverter with the zero-type structure is only half of that required by the bridge-type structure, and therefore the costs are lower, the control is simpler and more reliable, and it is easier to realize natural non-circulating current control. Therefore, in the present invention, the multi-pulse cycloconverter adopts a zero-type topology structure, which is composed of three-phase thyristor modules with the same internal topology structure. The $k^{th}$ phase of input of the multi-pulse cycloconverter is connected to the $k^{th}$ group of anti-parallel thyristors in thyristor modules of all phases, and an output side of the multi-pulse cycloconverter is connected to corresponding three-phase machines 1-$m$. The carrier generation module generates carrier signals corresponding to k groups of anti-parallel thyristors according to phase angles of the k phases of high-frequency AC voltages output by the modular multilevel converter. The speed vector controller generates voltage modulation signals corresponding to the thyristor modules of all phases according to a machine speed and a reference value thereof, an AC current output from the multi-pulse cycloconverter to the machine, and the k phases of high-frequency AC voltages with the phase difference of $2\pi/k$ output by the modular multilevel converter. The multi-pulse modulator generates trigger pulses of the thyristor modules of all phases of the multi-pulse cycloconverter by performing multi-pulse modulation on the carrier signals corresponding to the k groups of anti-parallel thyristors and the voltage modulation signals corresponding to the thyristor modules of all phases in combination with a current direction at an output side of the multi-pulse cycloconverter.

As an improvement of the present invention, three-phase thyristor modules with the same internal topology structure all include k groups of anti-parallel thyristors, and each group of anti-parallel thyristors includes thyristors.

A method for controlling a high-power machine drive system based on a modular multilevel converter includes the following steps. The MMC outputs k phases of high-frequency AC voltages with a phase difference of $2\pi/k$, and the multi-pulse cycloconverter outputs a low-frequency voltage to drive a corresponding machine. Specifically, the steps are shown below.

(1) The MMC adopts a high frequency modulation mode, and an AC side outputs k phases of high-frequency AC voltages with a phase difference of $2\pi/k$. An $i^{th}$ phase of modulation signal is $y_i = m_1 \sin[2\pi f_{mmc} t - 2\pi(i-1)/k + \theta_{mmc}]$. m1 is a modulation coefficient, which is an allowed maximum value, so that the MMC can output the maximum voltage. $f_{mmc}$ is a frequency at which the MMC outputs a voltage, which is usually several hundred Hz (such as 300 Hz). $\theta_{mmc}$ is a phase angle of a first phase of high frequency AC voltage.

(2) A phase-locked loop (PLL) is used to obtain the phase angle $\theta_{mmc}$ of the high-frequency AC voltage on the AC output side of the MMC, and carriers W1-Wk respectively corresponding to k groups of anti-parallel thyristors are generated. The carriers corresponding to the $i^{th}$ group of anti-parallel thyristors are $W_i = \sin[2\pi f_{mmc} t - \pi i/k + \theta_{mmc}]$.

(3) Three-phase low-speed operating machines 1-$m$ all adopt speed vector control. The three-phase machine m is used as an example. The control method thereof is obtaining three-phase voltage modulation signals $y_{maref}$, $y_{mbref}$, and $y_{mcref}$ at the output side of the multi-pulse cycloconverter according to an actual speed n of the three-phase machine, a reference value $n_{ref}$ of the speed, three-phase currents $i_{am}$, $i_{bm}$, and $i_{cm}$ at a machine side, and high-frequency AC voltages $u_{m1}$-$u_{mk}$.

(4) Multi-pulse cycloconverter modulation is performed on the carrier waves W1-Wk and the modulation signal $y_{maref}$ corresponding to a phase A thyristor module, to obtain trigger pulses $S_{1\_1a}$, $S_{2\_1a}$, ..., $S_{1\_ka}$, $S_{2\_ka}$ of phase A k groups of anti-parallel thyristors. Multi-pulse cycloconverter modulation is performed on the carrier waves W1-Wk and the modulation signal $y_{mbref}$ corresponding to a phase B thyristor module, to obtain trigger pulses $S_{1\_1b}$, $S_{2\_1b}$, ..., $S_{1\_kb}$, $S_{2\_kb}$ of phase B k groups of anti-parallel thyristors. Multi-pulse cycloconverter modulation is performed on the carrier waves W1-Wk and the modulation signal $y_{mcref}$ corresponding to a phase C thyristor module, to obtain trigger pulses $S_{1\_1c}$, $S_{2\_1c}$, ..., $S_{1\_kc}$, $S_{2\_kc}$ of phase C k groups of anti-parallel thyristors. Groups of forward connected thyristors and reversely connected thyristors in each phase of the thyristor module are driven by these trigger pulses, thereby outputting the low-frequency voltage to drive the machine m. The control method for the remaining three-phase machines is similar.

The present invention has the following beneficial effects by adopting the above technical solution.

(1) According to the present invention, the problem of larger fluctuations of the capacitor voltage during direct drive of the high-power low-speed machine by the MMC is solved. Since the fluctuation of a capacitor voltage of each sub-module of the MMC is inversely proportional to the AC side output frequency. If the MMC is used to directly drive the high-power low-speed machine, large fluctuations of the capacitor voltage of the sub-module may be caused. The existing solution adopts the method of increasing the capacitance of the capacitor to suppress the fluctuation of the capacitor voltage of the sub-module within the allowable range, which also causes the problem of larger proportions of the volume and the weight of the capacitor and higher system construction and maintenance costs. However, according to the present invention, the MMC is combined with the multi-pulse cycloconverter to form a high-power machine drive system. While ensuring the quality of the output waveform on the machine side, the operating frequency of the MMC can be controlled at the level of several hundred hertz. Compared with the existing solution, the capacity of an energy storage capacitor of the MMC can be significantly reduced, and the volume and weight of the energy storage capacitor of the MMC are reduced.

(2) According to the present invention, the system is highly modularized and is easily expanded according to the capacity requirements. The MMC has the characteristic of modularization, a specific phase number of the MMC and the number of sub-modules required to be included in all phases of arms can be determined according to the actual drive system capacity requirements, so that the system is highly modularized and has more practical engineering value. In addition, by increasing the number of sub-modules included in all phases of arms, the withstand voltage requirement of a single power device can be significantly reduced. By increasing the number of pulses of the cycloconverter, the quality of the output waveform at the machine side can be significantly improved, thereby ensuring stable and safe operation of the machine. According to the present invention, the system is highly modularized, and the system is easy to expand according to the capacity requirements, which is the essential difference between the present invention and other existing solutions of high-power low-speed machine driving.

(3) According to the present invention, based on the existing MMC module, driving of the high-power low-speed machine is implemented without changing the basic structure of the MMC, and therefore there is no need to adjust the related control method of the MMC. The whole control solution is simple and easy to understand and implement.

(4) According to the present invention, through the modularity of the system, redundant control can be performed, which can greatly improve the reliability of the system.

REFERENCE NUMERALS

1. Modular multilevel converter, 1-1. Sub-module, 1-2. Arm inductor, 1-3. DC bus, 2. Multi-pulse cycloconverter,

2-1. Phase-A thyristor module, $VT_{1\_1a}$, $VT_{1\_2a}$, $VT_{1\_3a}$, and $VT_{1\_ka}$ are the first group of forward connected thyristors, the second group of forward connected thyristors, the third group of forward connected thyristors, and the $k^{th}$ group of forward connected thyristors in the phase A thyristor module, and $VT_{2\_1a}$, $VT_{2\_2a}$, $VT_{2\_3a}$, and $VT_{2\_ka}$ are the first group of reversely connected thyristors, the second group of reversely connected thyristors, the third group of reversely connected thyristors, and the $k^{th}$ group of reversely connected thyristors in the phase A thyristor module.

DETAILED DESCRIPTION

In order to deepen the knowledge and understanding of the present invention, the technical solution is further introduced below with reference to the accompanying drawings and specific embodiments.

Figure 1A:
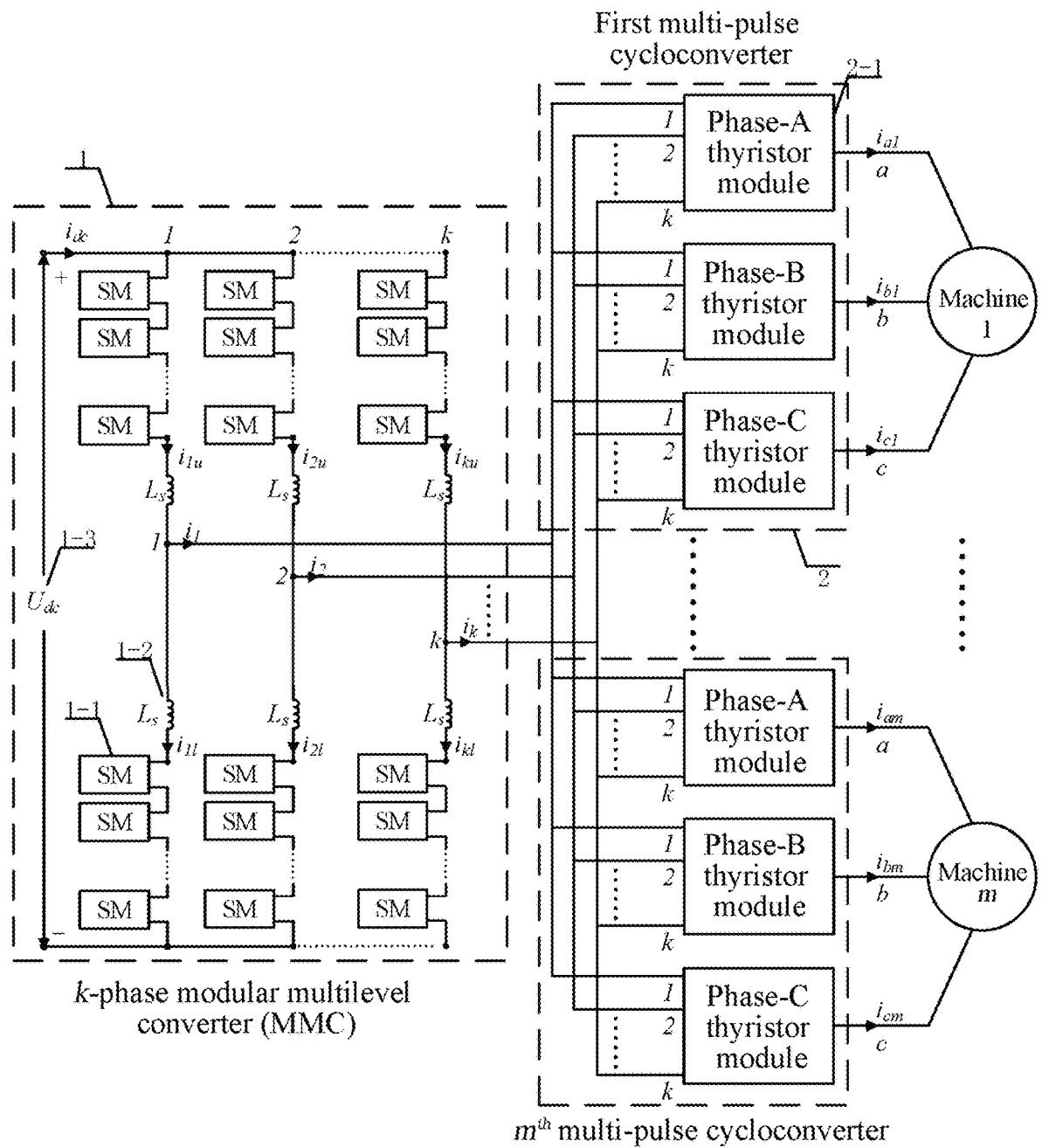
FIG. 1 (a) is a structural diagram of a high-power machine drive system according to the present invention, FIG. 1 (b) is a system structure diagram of phase A thyristor module, and FIG. 1 (c) is a structural diagram of the sub-module.
Figure 1B:
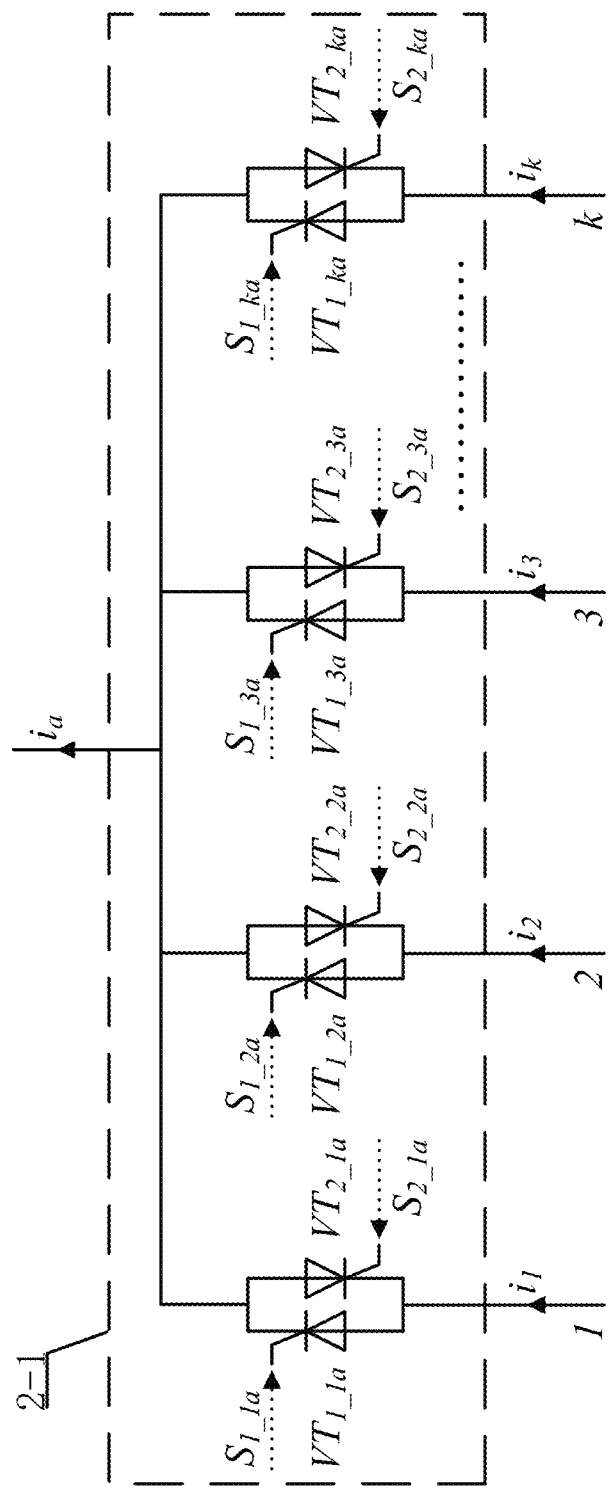
Figure 1C:
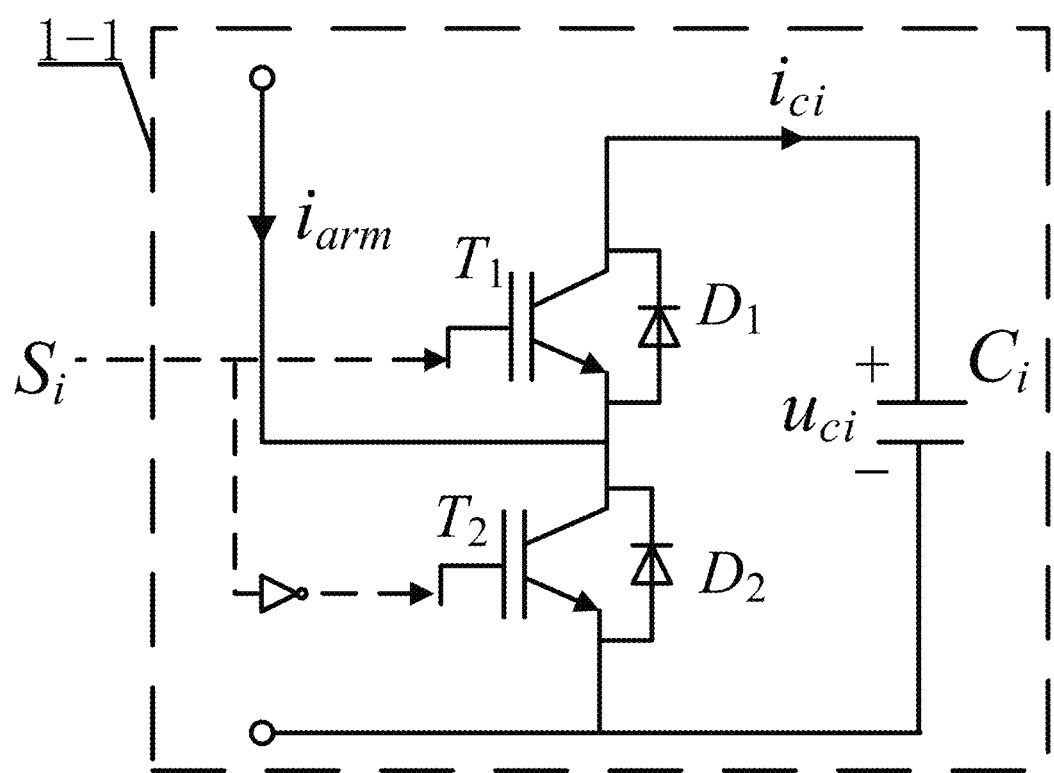

As shown in FIG. 1 (a), a high-power machine drive system based on a modular multilevel converter (MMC) consists of a modular multilevel converter 1 and a multi-pulse cycloconverter 2. The MMC includes k phases of AC side outputs, and each phase of the converter includes upper and lower arms, and each of the arms includes n identical sub-modules 1-1 and an arm inductor 1-2. The sub-module is a half-bridge topology structure, or may be other topology structures such as a full-bridge sub-module, a clamp double sub-module, and the like. DC sides of all the phases are all connected to the same DC bus 1-3, and the $k^{th}$ phase of AC side output of the converter is connected to the $k^{th}$ phase of input of each of the multi-pulse cycloconverters. Moreover, in the above MMC topology, the number k of phases and the number n of sub-modules included in each of the arms are determined by design indicators such as the capacity of the drive system. The multi-pulse cycloconverter adopts the zero-type topology structure, which is composed of three-phase thyristor modules with the same internal topological structure. The phase A thyristor module 2-1 is shown in FIG. 1 (b). Each of the thyristor modules includes k groups of anti-parallel thyristors, and each group of anti-parallel thyristors includes thyristors $VT_{1\_i}$ and $VT_{2\_i}$. The $k^{th}$ phase of input of the multi-pulse cycloconverter is connected to the $k^{th}$ group of anti-parallel thyristors in thyristor modules of all phases, and an output side of the multi-pulse cycloconverter is connected to corresponding three-phase machines 1-m.

Figure 2:
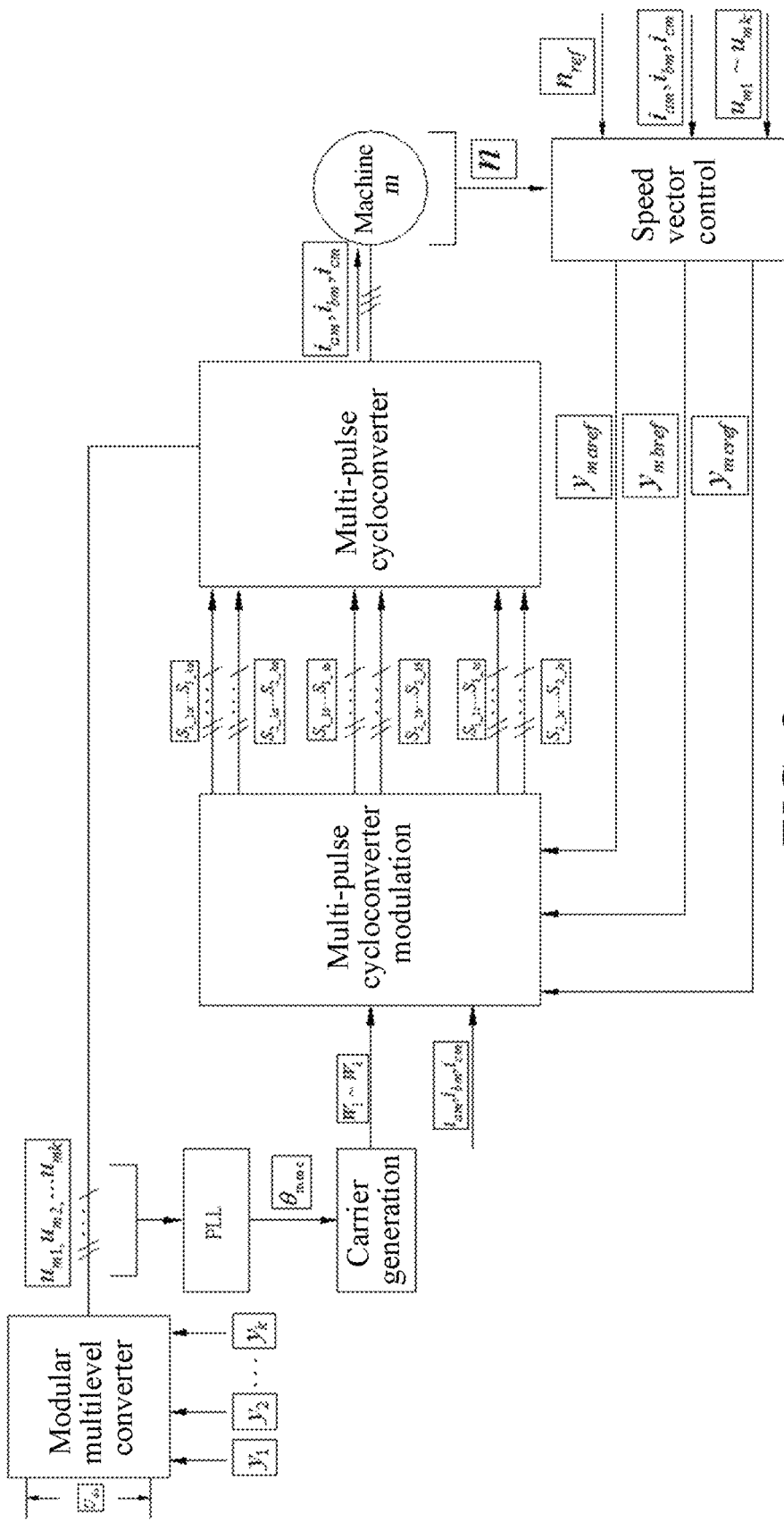
FIG. 2 is a control block diagram of a high-power machine drive system according to the present invention.

A high-power machine drive system based on a modular multilevel converter is shown in FIG. 2, including: a modular multilevel converter (MMC), a multi-pulse cycloconverter, a carrier generation module, a speed vector controller, and a multi-pulse modulator. The arms of all phases of the MMC are connected to a same DC bus, and the MMC outputs k phases of high-frequency AC voltages with a phase difference of $2\pi/k$. All phases of thyristor modules of the multi-pulse cycloconverter consist of k groups of anti-parallel thyristors, input ends of the thyristor modules of all the phases are connected to the k phases of high-frequency AC voltages with the phase difference of $2\pi/k$, and the multi-pulse cycloconverter outputs a frequency-converted AC power to a to-be-driven high-power machine. The carrier generation module generates carrier signals corresponding to the k groups of anti-parallel thyristors according to phase angles of the k phases of high-frequency AC voltages output by the modular multilevel converter. The speed vector controller generates voltage modulation signals corresponding to the thyristor modules of all phases according to a machine speed and a reference value thereof, an AC current output from the multi-pulse cycloconverter to the machine, and the k phases of high-frequency AC voltages with the phase difference of $2\pi/k$ output by the modular multilevel converter. The multi-pulse modulator generates trigger pulses of the thyristor modules of all phases of the multi-pulse cycloconverter by performing multi-pulse modulation on the carrier signals corresponding to the k groups of anti-parallel thyristors and the voltage modulation signals corresponding to the thyristor modules of all phases in combination with the current direction at an output side of the multi-pulse cycloconverter.

The control method of the system is a coordinated control solution between the MMC, the multi-pulse cycloconverter, and the three-phase machine, including the following steps. The MMC outputs k phases of high-frequency AC voltages with a phase difference of $2\pi/k$, and the multi-pulse cycloconverter outputs a low-frequency voltage to drive a corresponding machine. The method specifically includes the following steps.

(1) The modular multilevel converter adopts a high frequency modulation mode. By comparing modulation signals $y_i$ (i=1, 2, . . . , k) with a high-frequency isosceles triangle carrier, the number of sub-modules $n_{iu\_on}$ ($n_{il\_on}$) that need to be input by upper arms (lower arms) of all phases can be achieved. An $i^{th}$ phase of modulation signal is $y_i = m_1 \sin[2\pi f_{mmc}t - 2\pi(i-1)/k + \theta_{mmc}]$. m1 is a modulation coefficient, which is an allowed maximum value, so that the MMC can output the maximum voltage. $f_{mmc}$ is a frequency at which the MMC outputs a voltage, which is usually several hundred Hz. $\theta_{mmc}$ is a phase angle of a first phase of high frequency AC voltage. Then capacitor voltages of the upper arm (lower arm) sub-modules of all phases are sorted in ascending order. When the arm current $i_{iu}$ ($i_{il}$) is positive, the number $n_{iu\_on}$ ($n_{il\_on}$) of sub-modules with the lowest capacitor voltage are input. When the arm current (iii) is negative, the number $n_{iu\_on}$ ($n_{il\_on}$) of sub-modules with the highest capacitor voltage are input, so that the AC side of the MMC outputs k phases of high-frequency AC voltages with a phase difference of $2\pi/k$.

(2) A phase-locked loop (PLL) is used to obtain the phase angle $\theta_{mmc}$ of the high-frequency AC voltage on the AC output side of the MMC, and carriers W1-Wk respectively corresponding to k groups of anti-parallel thyristors are generated. The carriers corresponding to the $i^{th}$ group of anti-parallel thyristors are $W_i = \sin[2\pi f_{mmc}t - \pi i/k + \theta_{mmc}]$.

(3) Three-phase low-speed operating machines 1-m all adopt speed vector control. The three-phase machine m is used as an example. The control method thereof is obtaining three-phase voltage modulation signals $y_{maref}$, $y_{mbref}$, and $y_{mcref}$ at the output side of the multi-pulse cycloconverter according to an actual speed n of the three-phase machine, a reference value $n_{ref}$ of the speed, three-phase currents $i_{am}$, $i_{bm}$, and $i_{cm}$ at a machine side, and high-frequency AC voltages $u_{m1}$-$u_{mk}$.

(4) Multi-pulse cycloconverter modulation is performed on the carrier waves W1-Wk and the modulation signal $y_{maref}$ corresponding to a phase A thyristor module, to obtain trigger pulses $S_{1\_1a}$, $S_{2\_1a}$, . . . , $S_{1\_ka}$, $S_{2\_ka}$ of phase A k groups of anti-parallel thyristors. Multi-pulse cycloconverter modulation is performed on the carrier waves W1-Wk and the modulation signal $y_{mbref}$ corresponding to a phase B thyristor module, to obtain trigger pulses $S_{1\_1b}$, $S_{2\_1b}$, . . . , $S_{1\_kb}$, $S_{2\_kb}$ of phase B k groups of anti-parallel thyristors. Multi-pulse cycloconverter modulation is performed on the carrier waves W1-Wk and the modulation signal $y_{mcref}$ corresponding to a phase C thyristor module, to obtain trigger pulses $S_{1\_1c}$, $S_{2\_1c}$, . . . , $S_{1\_kc}$, $S_{2\_kc}$ of phase C k groups of anti-parallel thyristors. Groups of forward connected thyristors and reversely connected thyristors in each phase of the thyristor module are driven by these trigger pulses, thereby outputting the low-frequency voltage to drive the machine m. The control method for the remaining three-phase machines is similar.

The method of multi-pulse cycloconverter modulation in step (4) is analyzed by using the phase A thyristor module as an example (the other two-phase modules are similar), which is specifically as follows.

(a) For all the groups of forward connected thyristors $VT_{1\_1a}$-$VT_{1\_ka}$ in the phase A thyristor module, respective trigger pulses $S_{1\_1a}$-$S_{1\_ka}$ are obtained by respectively comparing falling edges of the carriers W1-Wk with the modulation signal $y_{maref}$. If the carrier is less than the modulation signal, the trigger pulse is continuously sent, otherwise the trigger pulse is not sent.

(b) For all the groups of reversely connected thyristors $VT_{2\_1a}$-$VT_{2\_ka}$ in the phase A thyristor module, respective trigger pulses $S_{2\_1a}$-$S_{2\_ka}$ are obtained by respectively comparing rising edges of the carriers W1-Wk with the modulation signal $y_{maref}$. If the carrier is greater than the modulation signal, the trigger pulse is continuously sent, otherwise the trigger pulse is not sent.

(c) If the current direction $i_{am}$ at the output side of the cycloconverter is greater than 0, all the groups of reversely connected thyristors $VT_{2\_1a}$-$VT_{2\_ka}$ are locked; and if the current direction $i_{am}$ at the output side of the cycloconverter is less than 0, all the groups of forward connected thyristors $VT_{1\_1a}$-$VT_{1\_ka}$ are locked.

The present invention is especially suitable for high-power low-speed machine drive. Compared with the existing method, according to the present invention, the MMC is combined with the multi-pulse cycloconverter, and by adopting the MMC that operates at a high frequency, the capacity, the volume, and the weight of the energy storage capacitor of the MMC are reduced, the voltage level at the DC side of the MMC is increased, and the capacity of the drive system is increased. By adopting the multi-pulse cycloconverter, quality of an output waveform at a machine side can be guaranteed, thereby implementing low frequency control on the machine.

It should be noted that the above embodiments are not used to limit the protection scope of the present invention, and equivalent changes or substitutions made on the basis of the above technical solutions fall within the protection scope of the claims of the present invention.

What is claimed is:

1. A high-power machine drive system based on a modular multilevel converter, comprising: a modular multilevel converter, arms of all phases being connected to a same DC bus, and the modular multilevel converter outputting k phases of high-frequency AC voltages with a phase difference of $2\pi/k$;

a multi-pulse cycloconverter whose thyristor modules of all phases consist of k groups of anti-parallel thyristors, input ends of the thyristor modules of all phases being connected to the k phases of high-frequency AC voltages with the phase difference of $2\pi/k$, and the multi-pulse cycloconverter outputting a frequency-converted AC power to a to-be-driven high-power machine;

a carrier generation module configured to generate carrier signals corresponding to the k groups of anti-parallel thyristors according to phase angles of the k phases of high-frequency AC voltages output by the modular multilevel converter, a speed vector controller configured to generate voltage modulation signals corresponding to the thyristor modules of all phases according to a machine speed and a reference value thereof, an AC current output from the multi-pulse cycloconverter to the machine, and the k phases of high-frequency AC voltages with the phase difference of $2\pi/k$ output by the modular multilevel converter;

a multi-pulse modulator configured to generate trigger pulses of the thyristor modules of all phases of the multi-pulse cycloconverter by performing multi-pulse modulation on the carrier signals corresponding to the k groups of anti-parallel thyristors and the voltage modulation signals corresponding to the thyristor modules of all phases in combination with a current direction at an output side of the multi-pulse cycloconverter.

2. The high-power machine drive system based on a modular multilevel converter according to claim 1, wherein the modulation signals of the k phases of high-frequency AC voltages output by the modular multilevel converter are: $y_i=m_1 \sin[2\pi f_{mmc}t-2\pi(i-1)/k]$, wherein $y_i$ is a modulation signal of an i-phase high-frequency AC voltage, $m_1$ is a modulation coefficient, and $f_{mmc}$ is a frequency at which the MMC outputs a voltage.

3. The high-power machine drive system based on a modular multilevel converter according to claim 1, wherein a carrier signal $W_i$ corresponding to an $i^{th}$ group of anti-parallel thyristors in the k groups of anti-parallel thyristors is: $W_i=\sin[2\pi f_{mmc}t-+\theta_{mmc}-\pi(2i-3)/k]$, wherein $f_{mmc}$ is a frequency at which the MMC outputs a voltage, and $\theta_{mmc}$ are phase angles of the k phases of high-frequency AC voltages output by the modular multilevel converter.

4. The high-power machine drive system based on a modular multilevel converter according to claim 1, wherein a method of performing multi-pulse modulation on the carrier signals corresponding to the k groups of anti-parallel thyristors and the voltage modulation signals corresponding to the thyristor modules of all phases in combination with the current direction at the output side of the multi-pulse cycloconverter comprises:

locking all the groups of reversely connected thyristors when the current at the output side of the multi-pulse cycloconverter is in a forward direction, and locking all the groups of forward connected thyristors when the current at the output side of the multi-pulse cycloconverter is in a reverse direction;

for all the unlocked groups of forward connected thyristors in the thyristor module, comparing falling edges of the carrier signals corresponding to the k groups of anti-parallel thyristors with the voltage modulation signals corresponding to the thyristor module of the phase, and continuously sending trigger pulses when the carrier signals are less than the voltage modulation signals, or otherwise skipping sending the trigger pulses;

for all the unlocked groups of reversely connected thyristors in the thyristor module, comparing rising edges of the carrier signals corresponding to the k groups of anti-parallel thyristors with the voltage modulation signals corresponding to the thyristor module of the phase, and continuously sending trigger pulses when the carrier signals are greater than the voltage modulation signals, or otherwise skipping sending the trigger pulses.

5. The high-power machine drive system based on a modular multilevel converter according to claim 3, wherein the phase angles of the k phases of high-frequency AC voltages output by the modular multilevel converter are obtained through a phase-locked loop (PLL).

\* \* \* \* \*